United States Patent Office 3,433,590
Patented Mar. 18, 1969

3,433,590
DRY STABILIZED ALKALI METAL DITHIONITE COMPOSITIONS
Marina Adriana van Damme-van Weele, Hengelo, and Dirk Cornelis de Groot, Delden, Netherlands, assignors to N.V. Koninklijke Nederlandsche Zoutindustrie, Hengelo, Netherlands, a corporation of the Netherlands
No Drawing. Filed Apr. 7, 1965, Ser. No. 446,388
Claims priority, application Netherlands, Apr. 14, 1964, 6404003
U.S. Cl. 23—116          4 Claims
Int. Cl. C01b 17/98

ABSTRACT OF THE DISCLOSURE

Dry alkali metal dithionite compositions stabilized with respect to decomposition by exposure to air or moisture are produced by reacting the dithionite with a compound selected from the group consisting of propionaldehyde, butyraldehyde, valeraldehyde and benzaldehyde.

This invention relates to dry dithionite compositions having a reduced tendency of decomposing under the influence of moisture and air.

Sodium dithionite, often called sodium hydrosulfite, and related compounds are rather stable during storage if packed in sealed containers. However, when these products are coming into contact with air and moisture, decomposition occurs.

Several substances have been proposed as stabilizers, i.e. products which counteract the decomposition in one way or the other. Thus, U.S. specifications 1,810,663 and 2,121,397 mention various film-forming products which may be used as a protecting water-repellent "coating" of dithionite particles. Further, British specification 695,375 suggests the use of certain liquid esters as dithionite stabilizers.

It is an objection to such products that they are water-insoluble or water-immiscible so that an aqueous solution made from a dithionite composition stabilized therewith is not clear.

Evidently, this objection does not apply to water-soluble stabilizers which are also known. However, these stabilizers have to be used in relatively large amounts in order to obtain a reasonable stabilization. Thus, for instance, an amount in the order of 10% is required when adding a mixture of borax and paraformaldehyde which, according to U.S. specification 2,516,321, is more effective than each of the components and also than alkaline reacting stabilizers used before.

It is an object of this invention to provide dry stabilized dithionite compositions which overcome the objections to the compositions proposed heretofore. More specifically, an object of this invention is to provide dithionite compositions stabilized by relatively small amounts of stabilizers. Another object is to provide a stabilization of dithionite compositions by using a stabilizer which has an effective stabilizing action during storage without causing turbidity in an aqueous solution made by dissolving the stabilized composition.

These objects are attained by contacting dithionite compositions with propionaldehyde, butyraldehyde, valeraldehyde and/or benzaldehyde.

It may be left undecided whether the stabilization attained according to this invention is due to the aldehydes as such or to conversion products possibly formed at the surface of the dithionite particles.

In particular in using propionaldehyde and butyraldehyde the treatment can be carried out such that the composition to be stabilized is contacted with aldehyde vapour at elevated temperatures and/or reduced pressures in a dry or nearly dry state. Generally, the amount of aldehyde "bound" in the treatment is less than 0.1% by weight when treating compositions wherein at most ⅓ of the weight consists of particles smaller than 100 microns.

For completeness' sake it may be remarked that it was already known that dithionite solutions can be stabilized by the addition of formaldehyde and acetaldehyde (see Mellor, A Comprehensive Treatise on Inorganic and Theoretical Chemistry (1960), vol. 10, page 172). Further, conversion products of dithionites and aldehydes are known in particular formaldehyde-sulfoxilate known under the name "Rongalit," the stability of which is greater than that of dithionite.

However, the stabilizing action of very small quantities of the aldehydes used according to this invention on solid dithionite compositions could not be reduced therefrom. This action is the more so surprising since a treatment of solid dithionite compositions with formaldehyde or acetaldehyde does not provide the stability aimed at.

If desired, the treatment to be applied in accordance with this invention may be combined with other measures for enhancing the stability of the dry compositions, for example the addition of suberic acid, azelaic acid, sebacic acid or a salt of one of these acids, as described in co-pending application Ser. No. 441,313. Further, the compositions may contain other substances in admixture with the dithionites, such as agents having a sequestering capacity and/or enhancing the stability of aqueous dithionite solutions, for instance polyphosphate, soda ash and urea.

The invention will be further illustrated, but is not limited by the following examples.

EXAMPLE I

To a vacuum drier containing a mass of dried anhydrous sodium dithionite crystals, propionaldehyde was added in a quantity of 800 grs. per ton of dithionite. The temperature in the drier was 45° C. and the pressure at the beginning was 100 mm. Hg. After the aldehyde vapour had been acting upon the crystal mass during 10 minutes, the surplus vapour was sucked off.

In storing in contact with air at a temperature of 30° C. and a relative humidity of 75% the stabilized dried product appeared to show a reduction in the dithionite content of 18% in 24 hours, while an unstabilized product which otherwise had been obtained in the same manner, had a percentage of decomposition of 38 under the same storage conditions.

EXAMPLE II

In mixing 200 grs. of anhydrous sodium dithionite with 1 gr. of butyraldehyde a stabilized product was obtained, which showed a dithionite decomposition of 13% in storing in contact with air at 30° C. and a relative humidity of 77% during 24 hours, in comparison with 43% when testing a sample of the unstabilized dithionite.

EXAMPLE III 100 grs. of a sodium dithionite composition containing about 2% of sodium chloride and 1% of sodium carbonate were mixed with 0.5 gr. of benzaldehyde. In storing the stabilized composition in contact with air at 30° C. and a relative humidity of 75% decomposition appeared to be 12% in 24 hours, against 35% when testing a sample of the composition which had not been treated with benzaldehyde.

What is claimed is:
1. A dry stabilized alkali metal dithionite composition comprising as an essential ingredient an alkali metal dithionite reacted with at least one compound selected from the group consisting of propionaldehyde, butyraldehyde, valeraldehyde and benzaldehyde.

2. A method for reducing the tendency of solid particulate alkali metal dithionites to decompose under the influence of moisture and air which comprises treating the alkali metal dithionite particles in a substantially dry state with the vapour of a compound selected from the group consisting of propionaldehyde and butyraldehyde.

3. The method as claimed in claim 2, wherein the vapour treatment is carried out at an elevated temperature.

4. The method as defined in claim 2, wherein the vapour treatment is carried out at a reduced pressure.

References Cited

UNITED STATES PATENTS

| | | | |
|---|---|---|---|
| 3,054,658 | 9/1962 | Franklin et al. | 23—116 |
| 3,353,909 | 11/1967 | Janson et al. | 23—116 |

OSCAR R. VERTIZ, *Primary Examiner.*

EARL C. THOMAS, *Assistant Examiner.*

U.S. Cl. X.R.

252—188